United States Patent [19]

Philippot et al.

[11] Patent Number: 5,397,430

[45] Date of Patent: Mar. 14, 1995

[54] CONTROLLED DISSOLUTION OF QUARTZ

[75] Inventors: Etienne Philippot, Saint Mathieu de Treviers; Olivier Cambon, Montpellier; Aline Goiffon, Saint Clement de Riviere; Alain Ibanez, Clapieres; Daniéle Cachau Hereillat, Le Cres, all of France

[73] Assignee: Compagnie D'Electronique et de Peizo-Electricite Cepe, Argenteuil, France

[21] Appl. No.: 85,871

[22] Filed: Jul. 6, 1993

[51] Int. Cl.$^6$ .............................................. H01L 21/00
[52] U.S. Cl. .................................. 156/662; 156/663; 156/637; 65/31; 252/79.1; 252/79.5
[58] Field of Search .................. 252/79.1, 79.5; 65/31; 156/662, 663, 637

[56] References Cited

U.S. PATENT DOCUMENTS 4,915,870  4/1990  Jones .

FOREIGN PATENT DOCUMENTS 2518084  6/1983  France .
57-055678  11/1982  Japan .

OTHER PUBLICATIONS

Chemical Abstracts, vol. 98, 1983, Columbus, Ohio, US; Abstract No. 153771A, "Quartz Oscillators" Colonne 1; & JP-A-57 176 815 (Citizen Watch Co., Ltd.) 30 Oct. 1982.
Chemical Abstracts, vol., 112, No. 67, 1990, Columbus, Ohio, US; A. S. Sandhu et al: "Effect of Nature of the Etchant on Anisotropic Track Etching in Quartz"

*Abrege* & Indian Journal of Pure Applied Physics vol. 28, No. 2, 1990, Dev. University, Amritsar, India. pp. 73–75.
Proceedings of the 39:th Annual Frequency Symp. 1985, IEEE Cat. No. 85ch2186-5, pp. 271–275. Library of Congress No. 58–60781, 29–31 May 1985 A. J. Bernot,; "Etching Study of At–Cut Cultured o; Quartz Using Etchants Containing Fluoride Salts, Hydrofluoric Acid, and Ammonium Bifluoride".
"Solubility of Quartz in Ammonium Fluoride Aqueous Solutions"; Safronov et. al; abstract only; 1972; IZV. Akad. Nauk SSSR, Neorg. Mater; 8(2).
"Dissolution and Crystallization of Quartz Under Hydrothermal Conditions"; Ganeer et. al.; 1971; abstract only; IZV. Akad. Nauk SSSR, Neorg Mater., 7(5).
"Study of the Surface Structure of Quartz Fibers by IR Fourier Transform Spectroscopy"; abstract only; Arutyunyan et. al.; 1983; Kolloidn, Zh. 45(2).

*Primary Examiner*—R. Bruce Breneman
*Assistant Examiner*—George Goudreau
*Attorney, Agent, or Firm*—Oblon, Spivak, McClelland, Maier & Neustadt

[57]  ABSTRACT

Quartz sections having a surface condition as polished as possible are prepared by controlled dissolution by placing said quartz sections in a bath of a quartz solvent or a mixture of solvents, wherein the bath is basic and comprises an alkaline hydroxide or fluoride, or ammonium hydroxide, or a mixture of these compounds; and conducting controlled dissolution of the quartz sections at atmospheric pressure.

11 Claims, No Drawings

CONTROLLED DISSOLUTION OF QUARTZ

BACKGROUND OF THE INVENTION

1. Field of the Invention

The present invention relates to a process for chemical dissolution of a crystalline material. It relates specifically to the chemical machining of piezoelectric materials.

2. Description of the Background

The proliferation of radiocommunication devices, the basic device of which is a piezoelectric resonator, has brought about a rapid development of piezoelectric materials. Quartz ($SiO_2$) is the most widely used material at this time.

A resonator is made from a section of piezoelectric material. At least one electrode is placed on each main side of the section. The resonator is characterized by its resonance frequency. This frequency corresponds to a specifically determined thickness of the section, between two electrodes. The surface condition of the section should be as favorable as possible, so as not to disrupt the frequency response of the resonator. To give the section the desired thickness, the section is machined at least in its center portion. Various machining processes are known. The higher the frequency of the resonator, the lesser the thickness of the section. At low frequency, machining may be mechanical. The section is ground with an abrasive. For example, for the AT cut of the quartz, a thickness of 40 $\mu$m corresponds approximately to a frequency of 40 MHz. For higher frequencies, it no longer is possible to perform mechanical machining. An ionic process may be used. The section is bombarded with accelerated argon ions. The process yields good results from the point of view of the surface of the section, but is costly.

A dissolution process, which uses, in solution, a solvent of the material to be acted upon, also may be employed. For example, a quartz section is immersed in a solution of hydrofluoric acid (HF) or ammonium bifluoride ($NH_4HF_2$). This process is less costly than ionic machining, but it is not satisfactory from the point of view of the condition of the surface of the section and thus of electrical behavior of the resonator.

Indeed, the crystalline materials do not have a perfect structure. They inevitably contain structural flaws such as dislocations which outcrop on the surface of the material. Dissolution by the solvent preferably starts at the site of the dislocations. Pits (alternatively "etch pits") then form on the surface of the material. They form grooves and turn into channels (alternatively "etch channels") which completely traverse the section. In short, the surface condition of the section is not improved. The pits and channels bring about serious disruptions in the area of frequency response of the resonator. This process can be used only with high-quality crystalline sections originating from high-purity crystals. A need therefore continues to exist for a method of improving the surface quality of a quartz resonator.

SUMMARY OF THE INVENTION

Accordingly, one object of the present invention is to provide a method for the controlled dissolution of quartz sections in order to provide the sections with a surface condition as polished as possible.

Briefly, this object and other objects of the invention as hereinafter will become more readily apparent can be attained in a process for the controlled dissolution of quartz sections by placing said quartz sections in a bath of a quartz solvent or a mixture of solvents, wherein the bath is basic and comprises an alkaline hydroxide or fluoride, or ammonium hydroxide, or a mixture of these compounds, and conducting controlled dissolution of the quartz sections at atmospheric pressure.

DETAILED DESCRIPTION OF THE PREFERRED EMBODIMENTS

The present process achieves the controlled dissolution of the quartz, thereby making it possible to achieve a suitable surface condition. This dissolution process is not very costly and employs a bath containing an alkali metal hydroxide or fluoride or ammonium hydroxide or a mixture of these compounds. Ammonium fluoride also may be used. Suitable alkali metals include lithium, sodium and potassium. The bath advantageously also may contain a soluble silicified compound. Preferably, when an alkali metal fluoride is used, it is mixed with a lithium, sodium, potassium or ammonium hydroxide, in order to limit the forceful action of the bath, the fluorides being far more active than the hydroxides.

The present process makes it possible to achieve very satisfactory results with quartz. Dissolution preferably is performed at a temperature ranging between 80° and 250° C. and is conducted at atmospheric pressure.

The process can be used to cut the edges of a quartz section, to thin out at least one area of the section or to hollow out at least one opening through the thickness of the section.

The process can be used to partially dissolve a quartz section, the section then being covered with a mask designed to protect a portion thereof.

When the quartz is immersed in a bath which is capable of dissolving it, a flux of silicified components from the quartz section into the bath takes place. When a quartz section is immersed in a bath which is capable of expanding it, a flux of components from the bath into the quartz section takes place. When the two fluxes counterbalance, the bath is said to be saturated. It contains, under the pressure and temperature conditions of the experiment, a Co molar concentration of silicon, a constituent of quartz, called solubility. In order to achieve a controlled expansion of the quartz, a bath super-saturated with silicon higher than the Co molar concentration. When the Cc molar concentration is far higher than the Co molar concentration, a very rapid and even anarchic expansion of the quartz is noted. Expansion no longer is controlled. Thermodynamic relationships demonstrate that proper expansion of the quartz can take place only when the Cc molar concentration is closer to the Co molar concentration.

It has been observed that the expansion and dissolution phenomena of crystalline materials are reciprocal.

In accordance with a preferred embodiment of the invention, prior to dissolution, the dissolution bath contains a quartz solvent and a soluble silicified material. The bath prior to dissolution is "under-saturated" with silicon. Prior to dissolution, the molar concentration of silicon is lower than the molar concentration of silicon which the bath would have at saturation (under the temperature and pressure conditions of dissolution).

The following examples will illustrate the implementation and the advantages of the invention.

Quartz sections cut into a block, then ground with an abrasive with a grain of approximately 3 $\mu$m are used. Their initial roughness is on the order of 0.17 $\mu$m.

Other sections are polished with an abrasive with a grain of approximately 0.3 μm. Their initial roughness is on the order of 0.01 μm.

In all the tests conducted, the average roughness Ra of the sample is measured prior to dissolution, then numerous times during dissolution, with a rugosimeter.

Measurements are taken at several sites on the section on both sides.

In the course of dissolution, the thickness of the material removed from both sides of the section (or depth P of dissolution) is controlled by measuring the resonance frequency of the section.

For example, the following setup may be used: A three-necked flask containing the dissolution bath is immersed in an oil bath. The temperature of the dissolution bath is homogenized by magnetic agitation. One of the necks contains a thermocouple which controls the temperature of the bath. The temperature range preferably is between 80° C. and 250° C. The second neck contains a coolant which prevents evaporation of the bath. At least one section intended to be machined is inserted into the liquid bath through the third neck.

The section is suspended and submerged from a platinum wire and held by a teflon (registered trademark) clamp or any other means of fastening which is resistant to the bath. Dissolution preferably is accomplished at atmospheric pressure. These temperature and pressure conditions facilitate implementation of the process, which make it possible to reduce its cost. The thickness of the material to be removed from a resonator section generally is slight. Conducting the operation in an autoclave at low pressure and at a temperature above 250° C., when an increased dissolution speed is desired, may be considered.

The quartz solvents used are alkaline hydroxides or fluorides, or mixtures of these compounds. Ammonium hydroxide also may be used. Nonetheless, in the case of hydroxides, the bath may be formulated with alkaline carbonates or borates and not directly with hydroxides. The borates and carbonates in solution in the water are in effect hydrolyzed under the operating conditions and produce the corresponding hydroxides. For example, $Na_2CO_3$ will be hydrolyzed to NaOH.

The use of mixtures of compounds (hydroxides and/or fluorides) offers the advantage of producing eutectics capable of affording fusion points lower than that of the pure compounds. Thus they are preferred here.

Example No. 1

The bath is composed, prior to dissolution, of:
NaOH: 70%
LiOH: 10%
$H_2O$: 20%

At the temperature of 140° C., the speed of dissolution is approximately 2 μm per hour. The sections tested are polished beforehand. It is noted that the initial 0.01 μm roughness Ra is retained throughout dissolution.

Example No. 2

The bath is composed, prior to dissolution, of:
NaOH: 72%
$H_2O$: 20%
$SiO_2$, $nH_2O$: 8% (silicic acid)

At the temperature of 200° C., the speed of dissolution is approximately 7 μm per hour. The sections tested are ground, their roughness is about 0.17 μm. An improvement is observed and the final roughness achieved is on the order of 0.05 μm.

Example No. 3

The bath is composed, prior to dissolution, of:
KOH: 80%
$H_2O$: 20%
Temperature of the bath: 195° C.
Speed of dissolution: 6 μm/hour
Initial roughness: Ra polished sample = 0.01 μm
Final roughness: 0.01 μm Example No. 4

The bath is composed, prior to dissolution, of:
NaOH: 40%
KOH: 40%
$H_2O$: 20%
Temperature of the bath: 200° C.
Speed of dissolution: 10 μm/hour
Initial roughness: Ra polished sample = 0.17 μm
Final roughness: 0.04 μm Example No. 5

The bath is composed, prior to dissolution, of:
NaOH: 70%
NaF: 20%
$H_2O$: 10%
Temperature of the bath: 180° C.
Speed of dissolution: 11 μm/hour
Initial roughness: Ra polished sample = 0.01 μm
Final roughness: 0.01 μm Example No. 6

The bath is composed, prior to dissolution, of:
NaOH: 60%
$NH_4F$: 30%
$H_2O$: 10%
Temperature of the bath: 150° C.
Speed of dissolution: 3 μm/hour
Initial roughness: Ra polished sample = 0.17 μm
Final roughness: 0.06 μm Example No. 7

The bath is composed, prior to dissolution, of:
KOH: 70%
$Na_2SiO_3$: 10%
$H_2O$: 20%
Temperature of the bath: 175° C.
Speed of dissolution: 4 μm/hour
Initial roughness: Ra polished sample = 0.01 μm
Final roughness: 0.01 μm On the basis of the sections (initial thickness 80 microns) deriving from these examples, it is possible to produce resonators with a frequency of 50 MHz (final thickness 34 microns, or a dissolution of 23 microns per side), the electronic characteristics of which are as follows:

F = 46,485 MHz
R = 15 ohms (in air)
L = 3.7 mH
Q = 69000, or a productivity of $Q*F = 3 \cdot 10^{12}$, which is very efficient compared with ionic thinning.

The process for controlled dissolution in accordance with the invention may be used to produce piezoelectric resonator sections. The quartz section may be thinned out in at least one area to attain a desired resonance frequency.

The process for controlled dissolution in accordance with the invention may be used to hollow out at least one opening through a quartz section. Such a section may be used as a pickup. The principal fields are temperature, power, pressure, and the like.

The process for controlled dissolution in accordance with the invention also may be used to cut the edges of a quartz section to the desired dimensions. If the section is to be partially acted upon, it may be covered with a mask designed to protect a portion thereof. The mask may be of resin, metal or other materials not acted upon by the bath.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A process for the dissolution of quartz sections thereby achieving surface polishing of the quartz sections, comprising:

placing said quartz sections in a bath of a quartz solvent or a mixture of solvents, said solvent(s) being basic and containing at least one member selected from the group consisting of an alkaline hydroxide, an alkaline fluoride and ammonium hydroxide; and dissolving quartz from said quartz sections under atmospheric pressure to polish said quartz sections.

2. The process in accordance with claim 1, wherein the bath further comprises a soluble silicified compound.

3. The process in accordance with claim 1, wherein the alkali metal of the alkaline hydroxide or alkaline fluoride is lithium, potassium or sodium.

4. The process in accordance with claim 1, wherein, when the bath contains an alkaline fluoride, it also comprises a lithium, sodium, potassium or ammonium hydroxide which limits the forceful action of the bath.

5. The process in accordance with claim 1, wherein the presence of hydroxide in the bath results from the hydrolysis of alkali or ammonium borates or carbonates employed as starting materials in the preparation of the bath.

6. The process in accordance with claim 1, wherein the bath, prior to dissolution of the quartz, contains silicon, the molar concentration of this element being greater than zero and less than the molar concentration of said element which the bath would have at saturation, under the temperature and pressure conditions of dissolution.

7. The process in accordance with claim 1, wherein the dissolution is effected at a temperature ranging between 80° C. and 250° C.

8. The process in accordance with claim 1, wherein the dissolution shapes the edges of a quartz section to the desired dimensions.

9. The process in accordance with claim 1, wherein the dissolution thins out at least one area of a quartz section.

10. The process in accordance with claim 1, wherein the dissolution hollows out at least one opening through a quartz section.

11. The process in accordance with one of the claims 8 to 10, wherein the section is covered with a mask to protect certain portions thereof.

* * * * *